(12) United States Patent
Freund et al.

(10) Patent No.: US 8,302,399 B1
(45) Date of Patent: Nov. 6, 2012

(54) ORGANIC RANKINE CYCLE SYSTEMS USING WASTE HEAT FROM CHARGE AIR COOLING

(75) Inventors: Sebastian W. Freund, Garching bei Munich (DE); Gabor Ast, Jenbach (AT); Pierre Huck, Garching bei Munich (DE); Sara Rocci Denis, Garching bei Munich (DE); Monika Muehlbauer, Garching bei Munich (DE); Albert Scharl, Jenbach (AT); Wolfgang Madl, Jenbach (AT)

(73) Assignee: General Electric Company, Schenectady, NY (US)

( * ) Notice: Subject to any disclaimer, the term of this patent is extended or adjusted under 35 U.S.C. 154(b) by 67 days.

(21) Appl. No.: 13/106,929

(22) Filed: May 13, 2011

(51) Int. Cl.
*F02B 33/44* (2006.01)

(52) U.S. Cl. ............. 60/605.1; 60/612; 60/618; 60/651; 60/671

(58) Field of Classification Search .................. 60/605.1, 60/612, 614, 616, 618, 651, 655, 671
See application file for complete search history.

(56) References Cited

U.S. PATENT DOCUMENTS

| 5,069,194 | A  | * | 12/1991 | Deutschmann et al. ...... 123/612 |
| 6,729,137 | B2 | * | 5/2004  | Filippone ........................ 60/670 |
| 7,013,644 | B2 |   | 3/2006  | Radcliff et al. |
| 7,721,543 | B2 | * | 5/2010  | Massey et al. .................. 60/618 |
| 2009/0113928 | A1 |   | 5/2009 | Vandor et al. |
| 2009/0211253 | A1 |   | 8/2009 | Radcliff et al. |
| 2011/0016863 | A1 |   | 1/2011 | Ernst |
| 2011/0209473 | A1 | * | 9/2011 | Fritz et al. .................... 60/605.2 |

OTHER PUBLICATIONS

Unknown, Title: "Novel Waste Heat Recovery System in Intercooled Gas Pipeline Compressor Stations", 2011, p. 1 (Abstract).

* cited by examiner

*Primary Examiner* — Hoang Nguyen
(74) *Attorney, Agent, or Firm* — Sutherland Asbill & Brennan LLP

(57) ABSTRACT

The present application and the resultant patent provide a waste heat recovery system for recovering heat from a number of turbocharger stages. The waste heat recovery system may include a simple organic rankine cycle system and a number of charge air coolers in communication with the turbocharger stages and the simple organic rankine cycle system. The charge air coolers are positioned in a number of parallel branches of the simple organic rankine cycle system.

20 Claims, 2 Drawing Sheets

ORGANIC RANKINE CYCLE SYSTEMS USING WASTE HEAT FROM CHARGE AIR COOLING

TECHNICAL FIELD

The present application and the resultant patent relate generally to power generation systems and more particularly relate to systems for recovering waste heat from charge air cooling of a turbocharger with the use of a simple organic rankine cycle system.

BACKGROUND OF THE INVENTION

Enormous amounts of waste heat are generated by a wide variety of industrial and commercial processes and operations. Example sources of waste heat include heat from space heating assemblies, steam boilers, engines, and cooling systems. With the use of low grade waste heat, such as waste heat having a temperature of below about 400 degrees Fahrenheit (about 204 degrees Celsius) for example, conventional heat recovery systems generally do not operate with sufficient efficiency to make the recovery of energy cost effective. The net result is that vast quantities of waste heat are simply dumped into the atmosphere, the ground, the water, or other types of surroundings without producing useful work.

The efficient integration of low temperature heat sources into a simple organic rankine cycle system to increase net power output, however, may pose thermodynamic challenges. Specifically, the low temperature heat sources generally compete against each other in terms of temperature and capacitance rate such that the overall recovery of heat may be limited.

There is thus a desire for an improved organic rankine cycle system or other type of waste heat system that effectively recovers waste heat over a wide temperature range from multiple low grade heat sources at different operating conditions. For example, the waste heat of one or more charge air coolers may be incorporated into an organic rankine cycle system that otherwise would be dissipated without producing useful work. Such a system would efficiently use the waste heat for increased net power output.

SUMMARY OF THE INVENTION

The present application and the resultant patent thus provide a waste heat recovery system for recovering heat from a number of turbocharger stages. The waste heat recovery system may include a simple organic rankine cycle system and a number of charge air coolers in communication with the turbocharger stages and the simple organic rankine cycle system. The charge air coolers are positioned in a number of parallel branches of the simple organic rankine cycle system.

The present application and the resultant patent further provide a method of recovering waste heat from a number of turbocharger stages. The method may include the steps of positioning a number of charge air coolers in communication with the number of turbocharger stages, positioning the number of charge air coolers in a number of parallel branches of a simple organic rankine cycle system, circulating a working fluid in the simple organic rankine cycle system, and preheating the working fluid in the number of charge air coolers.

The present application and the resultant patent further provide a waste heat recovery system for recovering heat from a first and a second stage of a turbocharger. The waste heat recovery system may include a simple organic rankine cycle system, a first charge air cooler in communication with the first turbocharger stage and the simple organic rankine cycle system, and a second charge air cooler in communication with the second turbocharger stage and the simple organic rankine cycle system. The first charge air cooler and the second charge air cooler are positioned in parallel branches of the simple organic rankine cycle system.

These and other features and improvements of the present application and the resultant patent will become apparent to one of ordinary skill in the art upon review of the following detailed description when taken in conjunction with the several drawings and the appended claims.

DETAILED DESCRIPTION

As discussed in detail below, the present application and the resultant patent provide a waste heat recovery system having an integrated rankine cycle system coupled to a number of waste heat sources. In this example, the waste heat sources may be the inner and after charge air coolers of a two stage turbocharged engine and the like. The heat from the charge air coolers may be integrated in different ways into the organic rankine cycle system for preheating the working fluid therein. Although the waste heat recovery systems using charge air coolers in the examples of FIGS. 1-3 may be described with reference to combustion engines, the systems also may be applicable to other types of heat generation systems such as gas turbines, geothermal, solar, industrial, residential heat sources, and the like.

Figure 1:
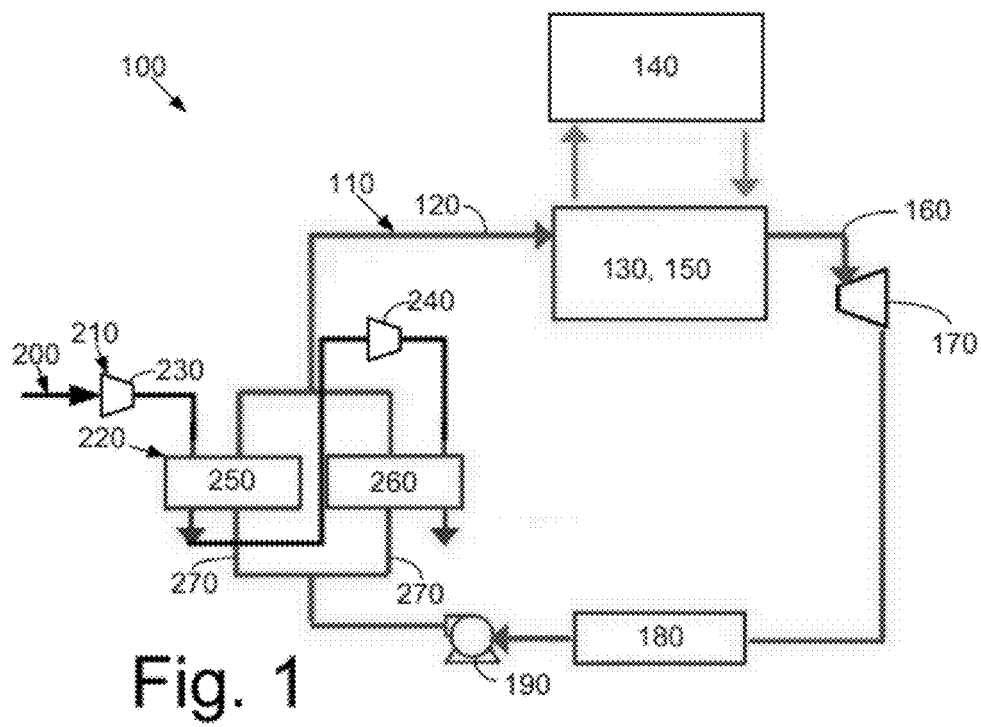
FIG. 1 is a schematic view of a waste heat recovery system having an integrated organic rankine cycle system using waste heat generated from charge air coolers.

Referring now to the drawings, in which like numerals refer to like elements throughout the several views, FIG. 1 shows a waste heat recovery system 100 as may be described herein. The waste heat recovery system 100 may include a simple organic rankine cycle system 110. A working fluid 120 may be circulated through the simple organic rankine cycle system 110. The working fluid 120 may be organic or a non-organic fluid. The working fluid 120 may include propane, butane, pentafluoro-propane, pentafluoro-butane, pentafluoro-polyether, silicone oil, cyclo-hexane, cyclo-propane, cyclo-pentane, cyclo-butane, thiophene, ketones, aromatics, and/or combinations thereof. The list of working fluids 120 herein is not exhaustive and other types of fluids may be used herein.

The simple organic rankine cycle system 110 may include an exhaust gas heat exchanger 130. The exhaust gas heat exchanger 130 may be coupled to a first heat source 140. The first heat source 140 may be an exhaust unit of a combustion engine. Other types of heat sources may be used herein. The temperature of the first heat source 140 in the case of the combustion engine may be in a temperature range of about 300 to about 500 degrees Celsius. Other temperatures may be used herein. In a further embodiment, the exhaust gas heat exchanger also may be in the form of an exhaust gas recirculation cooler 150. The exhaust gas recirculation cooler 150 may be in communication with the exhaust gases of the first heat source 140. Other types of heat sources and other types of heat exchangers may be used herein.

The exhaust gas heat exchanger 130 or the exhaust gas recirculation cooler 150 thus receives the heat generated by the first heat source 140 so as to vaporize the working fluid 120 into a working fluid vapor 160. The working fluid vapor 160 may be passed through an expander 170. The working fluid vapor 160 drives the expander 170 so as to produce useful work as in a generator and the like. The working fluid vapor 160 may be condensed back into liquid form in a condenser 180. The working fluid 120 may be pumped by a pump 190 or other type of device back to the exhaust gas heat exchanger 130, the exhaust gas recirculation cooler 150, or to another heat source. The rankine cycle then may be repeated. Other components and other configurations also may be used herein.

As described above, the first heat source 140 may be the exhaust gases of an engine 200 such as an internal combustion engine. The ambient air intake of such an internal combustion engine 200 may be compressed in a turbocharger 210 of multiple stages. This compression, however, increase the temperature of the intake air. As a result, one or more charge air coolers 220 may be used downstream of the turbocharger 210 so as to cool the intake air. Multiple charge air coolers 220 at multiple temperatures may be used herein. In this example, the turbocharger 210 may include a first stage 230 and a second stage 240. Likewise, the charge air coolers 220 may include an inner cooler or a first stage charge air cooler 250 and an outer cooler or a second stage charge air cooler 260. Any number of turbocharger stages and charge air cooler stages may be used herein. Other components and other configurations may be used herein.

The charge air coolers 220 may be integrated within the simple organic rankine cycle system 110. Specifically, the charge air coolers 220 may be positioned downstream of the pump 190 so as to preheat the working fluid 120. The first stage charge air cooler 250 and the second stage charge air cooler 260 may be arranged in a number of parallel branches 270. Any number of parallel branches 270 may be used herein. The flow of the working fluid 120 thus is split after the pump 190 into the parallel branches 270 where the working fluid 120 may absorb the waste heat from the turbochargers 210 within the charge air coolers 220. After such preheating, the working fluid 120 again may be mixed and flow towards the higher temperatures of the exhaust gas heat exchanger 130, the exhaust gas recirculation cooler 150, and the like. The otherwise wasted heat from cooling the charge air thus preheats the working fluid 120 so as to raise the flow rate and the net power output of the waste heat recovery system 100.

Figure 2:
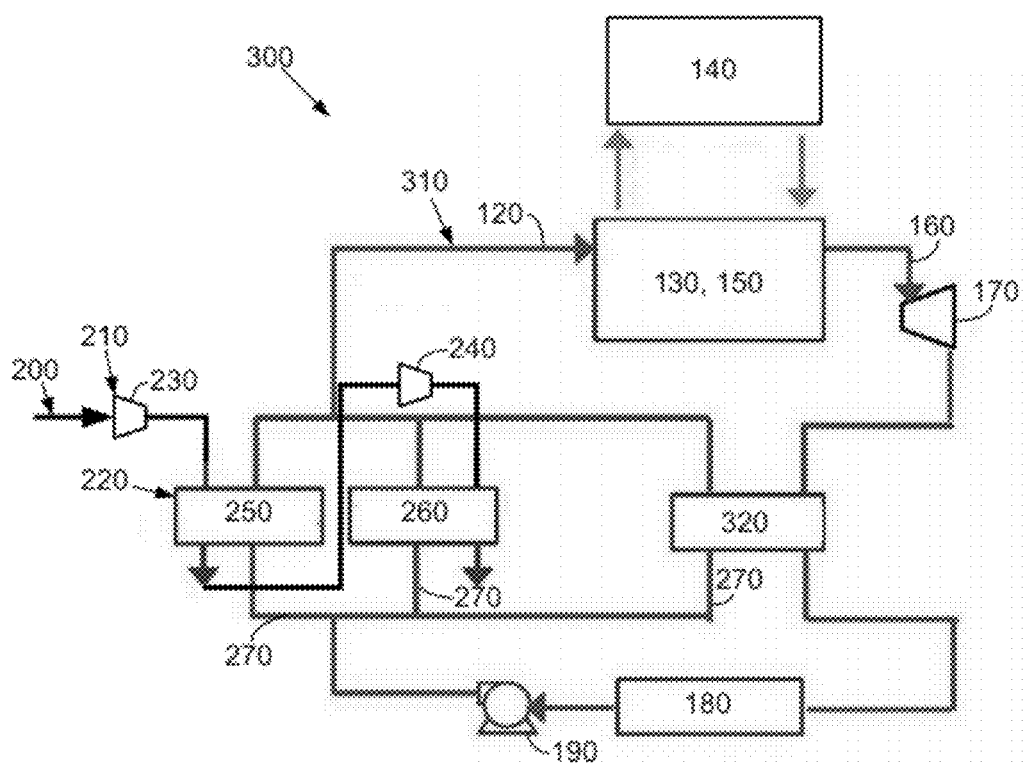
FIG. 2 is a schematic view of an alternative embodiment of a waste heat recovery system having an integrated organic rankine cycle system using waste heat generated from charge air coolers.

FIG. 2 shows a further embodiment of a waste heat recovery system 300 as may be described herein. As above, the waste heat recovery system 300 uses a simple organic rankine cycle system 310 similar to that described above. The simple organic rankine cycle system 310 may include the exhaust gas heat exchanger 130, the exhaust gas recirculation cooler 150, or another type of heat exchanger in communication with the first heat source 140. The simple organic rankine cycle system 310 also may include the expander 170, the condenser 180, the pump 190, and other components. The charge air coolers 220 likewise may be arranged in the parallel branches 270 so as to preheat the working fluid 120 with the waste heat form the turbochargers 210.

In this embodiment, the simple organic rankine cycle system 310 also may include a recuperator 320 positioned therein. Specifically, the recuperator 320 may be positioned downstream of the expander 170 and in communication with the working fluid vapor 160. Likewise, the recuperator 320 may be positioned on a further parallel branch 270 in parallel with the charge air coolers 220. The flow of working fluid 120 thus may be split into multiple flows downstream of the pump 190. A portion of the flow of the working fluid 120 may exchange heat with the working fluid vapor 160 before the working fluid flows 120 are again combined. Other configurations and other components may be used herein.

Figure 3:
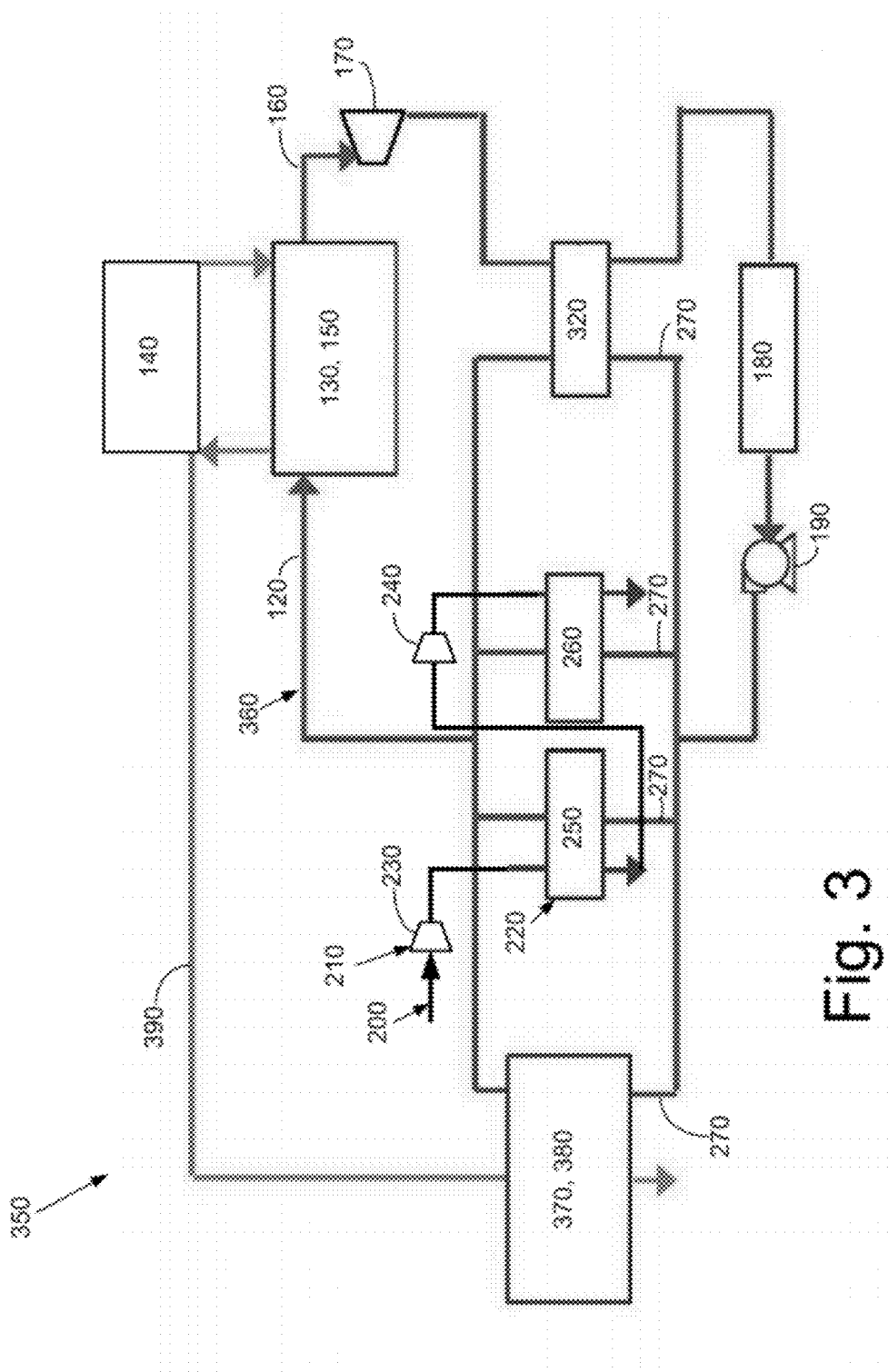
FIG. 3 is a schematic view of an alternative embodiment of a waste heat recovery system having an integrated organic rankine cycle system using waste heat generated from charge air coolers.

FIG. 3 shows a further embodiment of a waste heat recovery system 350 as may be described herein. The waste heat recovery system 350 also may include a simple organic rankine cycle system 360 similar to those described above. Specifically, the simple organic rankine cycle system 360 may include the exhaust gas heat exchanger 130, the exhaust gas recirculation cooler 150, or another type of heat exchanger in communication with the first heat source 140. The simple organic rankine cycle system 360 also may include the expander 170, the condenser 180, the pump 190, and other components.

The simple organic rankine cycle system 360 also may include the charge air coolers 220 and the recuperator 320 positioned on a number of the parallel branches 270. In this example, the simple organic rankine cycle system 360 also includes a further exhaust gas heat exchanger 370, a further exhaust gas recirculation cooler 380, or other type of heat exchanger in parallel with the charge air coolers 320 and/or recuperator 320 on one or more further parallel branches 270. An exhaust gas diversion line 390 may be in communication with the first heat source 140 so as to divert the exhaust gases therein. The integration of the further exhaust gas heat exchanger 370, the further exhaust gas recirculation cooler 380, or other type of heat exchanger on an additional parallel branch 270 thus provides extra heat to the working fluid 120 by reducing the exhaust gas temperature. Other components and other configurations may be used herein.

The waste heat recovery systems 100 described herein thus recover the otherwise wasted heat from the charge air coolers 220 for preheating the working fluid 120 in the simple organic rankine cycle systems so as to raise the flow rate and the net power output. The recuperator 320 also may be used herein. Moreover, other types of relatively low temperature heat sources such as those provided by the further exhaust gas heat exchanger 370 or the further exhaust gas recirculation cooler 380 also may be integrated into the parallel branches 270 so as to gain even more heat. More electricity or other type of useful work thus may be generated from the same engine without fundamentally changing the organic rankine cycle systems. Further heat sources also may be used herein. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A waste heat recovery system for recovering heat from a number of turbocharger stages, comprising:
    a simple organic rankine cycle system; and
    a plurality of charge air coolers in communication with the number of turbocharger stages and the simple organic rankine cycle system;
    wherein the plurality of charge air coolers is positioned in a plurality of parallel branches of the simple organic rankine cycle system.

2. The waste heat recover system of claim 1, wherein the simple organic rankine cycle system comprises a working fluid therein and wherein the plurality of charge air coolers preheat the working fluid.

3. The waste heat recovery system of claim 1, wherein the simple organic rankine cycle system comprises an exhaust gas heat exchanger in communication with a first heat source.

4. The waste heat recovery system of claim 1, wherein the simple organic rankine cycle system comprises an exhaust gas recirculation cooler in communication with a first heat source.

5. The waste heat recovery system of claim 1, wherein the simple organic rankine cycle system comprises an expander, a condenser, and a pump.

6. The waste heat recovery system of claim 1, wherein the plurality of charge air coolers comprises a first charge air cooler in communication with a first turbocharger stage and a second charge air cooler in communication with a second turbocharger stage.

7. The waste heat recovery system of claim 1, wherein the simple organic rankine cycle system comprises a recuperator.

8. The waste heat recovery system of claim 7, wherein the recuperator is positioned in the plurality of parallel branches.

9. The waste heat recovery system of claim 1, wherein the simple organic rankine cycle system comprises an exhaust gas heat exchanger positioned in the plurality of parallel branches.

10. The waste heat recovery system of claim 1, wherein the simple organic rankine cycle system comprises an exhaust gas recirculation cooler positioned in the plurality of parallel branches.

11. A method of recovering waste heat from a number of turbocharger stages, comprising:
    positioning a number of charge air coolers in communication with the number of turbocharger stages;
    positioning the number of charge air coolers in a plurality of parallel branches of a simple organic rankine cycle system;
    circulating a working fluid in the simple organic rankine cycle system; and
    preheating the working fluid in the number of charge air coolers.

12. The method of claim 11, further comprising the step of positioning a first heat source in communication with the simple organic rankine cycle system.

13. The method of claim 11, further comprising the step of positioning a recuperator in the plurality of parallel branches of the simple organic rankine cycle system.

14. The method of claim 11, further comprising the step of positioning an exhaust gas heat exchanger in the plurality of parallel branches of the simple organic rankine cycle system.

15. The method of claim 11, further comprising the step of positioning an exhaust gas recirculation cooler in the plurality of parallel branches of the simple organic rankine cycle system.

16. A waste heat recovery system for recovering heat from a first and a second stage of a turbocharger, comprising:
    a simple organic rankine cycle system;
    a first charge air cooler in communication with the first turbocharger stage and the simple organic rankine cycle system; and
    a second charge air cooler in communication with the second turbocharger stage and the simple organic rankine cycle system;
    wherein the first charge air cooler and the second charge air cooler are positioned in parallel branches of the simple organic rankine cycle system.

17. The waste heat recovery system of claim 16, further comprising a first heat source in communication with the simple organic rankine cycle system.

18. The waste heat recovery system of claim 16, wherein the simple organic rankine cycle system comprises a recuperator positioned in the parallel branches.

19. The waste heat recovery system of claim 16, wherein the simple organic rankine cycle system comprises an exhaust gas heat exchanger positioned in the parallel branches.

20. The waste heat recovery system of claim 16, wherein the simple organic rankine cycle system comprises an exhaust gas heat exchanger positioned in the parallel branches.

* * * * *